United States Patent [19]

Miyazaki

[11] 3,997,285
[45] Dec. 14, 1976

[54] APPARATUS FOR MOLDING AN EXTRUDED PRODUCT CONTAINING A REINFORCING MATERIAL

[76] Inventor: Hachiro Miyazaki, Ko-450, Oaza-Kuma, Shiota, Fujitsu, Saga, Japan

[22] Filed: Feb. 18, 1975

[21] Appl. No.: 550,508

[30] Foreign Application Priority Data

| Feb. 20, 1974 | Japan | 49-20226 |
|---|---|---|
| Aug. 15, 1974 | Japan | 49-93867 |
| Oct. 2, 1974 | Japan | 49-114088 |
| Oct. 3, 1974 | Japan | 49-114508 |

[52] U.S. Cl. .............. 425/113; 264/273; 264/279; 425/376
[51] Int. Cl.² ......................................... B29F 3/10
[58] Field of Search ............. 425/113, 114, 131.1, 425/133.5, 376, 461, 380; 264/260, 273, 275, 279, 173, 174, 176 R; 222/145

[56] References Cited

UNITED STATES PATENTS

| 3,146,508 | 9/1964 | Berliner et al. | 425/114 |
|---|---|---|---|
| 3,222,721 | 12/1965 | Reynolds, Jr. | 264/174 X |
| 3,692,448 | 9/1972 | Menasoff | 425/113 |
| 3,712,770 | 1/1973 | Arnaudin, Jr. | 264/173 X |
| 3,737,260 | 6/1973 | Kaye | 425/113 |
| 3,758,247 | 9/1973 | Deegen | 425/114 |

FOREIGN PATENTS OR APPLICATIONS

| 758,928 | 5/1967 | Canada | 425/113 |
|---|---|---|---|
| 1,124,236 | 2/1962 | Germany | 425/113 |
| 1,296,369 | 5/1969 | Germany | 425/113 |
| 431,990 | 3/1948 | Italy | 425/113 |
| 195,879 | 4/1967 | U.S.S.R. | 425/113 |

*Primary Examiner*—Richard B. Lazarus
*Assistant Examiner*—Mark Rosenbaum
*Attorney, Agent, or Firm*—Frank J. Jordan

[57] ABSTRACT

The present invention relates to an apparatus for economically molding extruded products containing reinforcement in desired shapes and in large quantities. The operation of the apparatus comprises inserting a reinforcement such as reinforcing bars into extruding materials such as cement, gypsum, plastics or the like during the extrusion molding stage and encasing them under pressure in a body in order to produce extruded articles containing reinforcement which are most suitable for use as construction or structural materials having high rigidity and which are light in weight. Moreover, the above-mentioned extrusion molding can be performed no matter how complicated the shape and structure of the reinforcement may be.

7 Claims, 20 Drawing Figures

APPARATUS FOR MOLDING AN EXTRUDED PRODUCT CONTAINING A REINFORCING MATERIAL

BACKGROUND OF THE INVENTION

In recent years, extruded products containing reinforcement have been widely employed as various construction materials, structural materials and the like due to the development of the composite extrusion technique. However, the above-mentioned extruded products contain reinforcement which is simple in shape such as straight wire rods, plate strips, shape steel or glass fibers, but the reinforcement does not sufficiently possess the characteristics of high rigidity and light weight. When employing extruded products as a prop or beam, the extruded products containing shaped steel as reinforcement have greater weight, so that rather than use them, special and expensive honeycomb beams must be employed where high-rigidity and light weight are particularly required.

SUMMARY OF THE INVENTION

It is an object of the present invention to provide an extruded product containing reinforcement which has high rigidity and light weight and which can be produced in desired shapes and economically in large quantities by using a so-called framework reinforcement in which reinforcing bars are assembled lengthwise and breadthwise or reinforcement which is composed of expanded metal screen or wire mesh in order to adapt the extruded product for use in various construction or structural materials.

Another object of the present invention is to provide an efficient extrusion molding apparatus.

A still further object of the present invention is to provide a technique for encasing different substances, extrusion materials and reinforcement, in the most desirable condition in the molding of extruded products which contain reinforcement.

A still further object of the present invention is to provide a composite extrusion technique which will be widely applicable to general use.

Other objects and features of the present invention will be apparent from the following description and the accompanying drawings.

PREFERRED EMBODIMENT OF THE INVENTION

The First Embodiment (FIGS. 1–7)

The first embodiment in FIGS. 1–7 shows an apparatus for most efficiently producing an extruded sheet containing reinforcement. In this embodiment, a reinforcement A includes reinforcing bars which are assembled lengthwise and breadthwise in a shape suitable to receive an extruded sheet B. An injection pipe 1 is attached to two extruding machines 2, 2 so that a Y-shaped forcing passage 3 is formed and the extruding materials which are injected from two different directions by the above extruding machines 2, 2 simultaneously join and are fed through the above injection pipe 1. In this embodiment, the extruding machines 2, 2 may be of a piston extruding type or a screw extruding type, and the above-mentioned pistons or screws are disposed in the injecting passages 3$a$, 3$a$ which come together to form the forcing passage 3. It is desirable that the included angle $\Theta$ formed by the injecting passage 3$a$ and the straight passage 3$b$ for joined flow is about 45°. In fact, it is desirable to make this angle $\Theta$ as small as possible, but the size of this angle $\Theta$ is restricted to some extent by the necessity of providing a guide passage for inserting the reinforcement A between the above-mentioned injection passages 3$a$, 3$a$.

Subsequently, there is provided adjacent to and attached to the end of injection pipe 1 a flow speed regulating pipe 5 in which a flow speed regulating passage 4 communicates with the straight passage 3$b$ where the flow of the extruding materials from the injecting passage 3$a$ is combined. Moreover, there is provided an extruding die 9 comprising a guide passage 6 for the regulated flow communicating with the flow speed regulating passage 4 and an extrusion passage 7 which leads to an extruding port 8. The extruding die 9 is attached adjacent to the front end of the flow speed regulating pipe 5. Alternatively, it is possible to carry out the present invention by directly attaching the extruding die 9 to the injection pipe 1, however, the encasement of reinforcement A by extruding materials may be performed more advantageously when the flow speed regulating pipe 5 is provided. That is, when extruding materials are injected under pressure from two different directions, the speed of the combined flow of extruding materials inevitably becomes rapid in the central portion, so that a crack is apt to be produced at the surface of the center of extruding materials. Therefore, a curved, streamlined shape throttle 10 for suppressing and controlling the flow speed in the center and uniformly regulating the flow is provided (see FIGS. 1–2).

Reinforcement A passes through a guide passage 12 located in a guide pipe 11 which extends along the straight passage 3b of injection pipe 1 and enters from an inlet behind the junction C of injecting passages 3a, 3a and is inserted into the regulated flow of extruding materials from an outlet which opens into the flow speed regulating passage 4. In this case, guide passage 12 need only be large enough to allow the desired shape of previously formed reinforcement A to pass through, whereby reinforcement A is successively drawn forward with the extruding materials by the extrusion pressure. The extruded sheet B containing the framework reinforcement A will pass out through the extruding port 8.

Furthermore, in order to easily insert reinforcement A, a conveyor device 13 is provided before the guide passage 12 and another conveyor device 14, for receiving the extruded sheet B, is provided at the final end of the extruding port 8. Moreover, it is preferable to operate the conveyors so as to keep the inserting force of reinforcement A and the receiving force of the extruded sheet B equal. A cutting device (not illustrated in the Figures) for cutting the desired length of the thus obtained extruded sheet B is arranged on the conveyor device 14 which receives the extruded sheet B.

In order to encase reinforcement A in the extruding materials to form a single body, it is necessary that the guide passage 6 for regulated flow bear a fixed relationship to the extrusion passage 7. That is, the total of the minimum cross-sectional area ($Sa+Sb$) of the guide passage 6 for regulated flow at the front angled edge of the guide pipe 11 (taken on lines $a-a$ and $b-b$ in FIG. 2) is required to be such that it is 1.1–2.0 times greater than the cross-sectional area $Sc$ of the extrusion passage 7 (taken on line $c-c$ of FIG. 2) and preferably is within the range of 1.3–1.5 times greater than the cross-sectional area $Sc$. In other words, the following relationship is desired; $1.1 \times Sc \leq Sa+Sb \leq 2.0 \times Sc$, and ideally $1.3 \times Sc \leq Sa+Sb \leq 1.5 \times Sc$.

1. If $Sa+Sb < 1.1 \times Sc$, the encasement of reinforcement materials becomes impossible and a completed extruded sheet B cannot be obtained.

2. If $Sa+Sb > 2.0 \times Sc$, the pressure for the encasement of reinforcement materials and the extruding pressure in the extrusion passage 7 becomes high and the inverse pressure also becomes high, whereby a so-called backward flow phenomenon occurs and the extruding materials become clogged in the space of the guide pipe 11, so that it becomes impossible for reinforcement A to progress forward into the extruding die 9 and the extrusion molding itself becomes absolutely impossible.

The ideal conditions for encasing reinforcement A in the extruding materials are when $1.3 \times Sc \leq Sa+Sb \leq 1.5 \times Sc$. Further, for the purpose of a smooth regulated flow of the extruding materials progressing to the extruding port 8 under the above-mentioned conditions, the end part of the guide pipe 11 must be made at as acute an angle as possible so that the angle $\phi$ at the end is 60° and the guide passage 6 for the regulated flow must be throttled parallel thereto and at an equal angle allowing the regulated flow to pass into extrusion passage 7.

Furthermore, in the case where reinforcement A is a framework reinforcement having crosspieces, it is necessary to achieve the above-mentioned relationship and in addition, to make the length of the extrusion passage 7 longer than 3 pitches of the crosspiece pitch $p$ in order to prevent the surface of the extruded sheet B from having a wavy appearance, which is called a swelling at the location of the crosspieces. (In the present embodiment, the length of the extrusion passage 7 is about 4.5 pitches of the crosspiece pitch $p$). The above-mentioned swelling does not occur in the case where reinforcement A is a wire, a plate, or shape steel which has a uniform cross-section running in the direction of extrusion; however, in the case where reinforcement A is a framework reinforcement or a meshwork reinforcement, the cross-section perpendicular to the direction of extrusion is not uniform, so that the above-mentioned swelling occurs due to the uneven encasement of the extruding materials (the density of extruding materials at the location of the crosspiece is thick, on the other hand, the density of extruding materials at the part between crosspieces is thin) if the length of the extrusion passage is shorter than the prescribed one. Thus, the length of the extrusion passage 7 relates to this phenomenon.

Generally, a straight portion is provided at the extruding port 8 of the extruding die 9 so as to effectively encase reinforcements and prevent the extruding port 8 from being worn away, but since in the present invention reinforcement A may be in any shape or structure, the above-mentioned relationship must be achieved particularly when reinforcement A has crosspieces. Therefore, reinforcements without crosspieces can be effectively extruded whether or not the length of the extrusion passage 7 achieves the above-mentioned relationship. The longer the extrusion passage 7, the less the above-mentioned swelling occurs, but on the other hand, the backward flow phenomenon is more likely to occur. For this reason, the length of the extrusion passage 7 must be kept to a minimum while holding the balance of the two above-mentioned phenomena.

Thus, the extruding materials which are supplied from the two extruding machines 2, 2 are forced into the straight passage 3b from two different directions through the injecting passages 3a, 3a which come together at injection pipe 1. Then, the thus forced extruding materials are joined in a regulated flow, and this regulated flow is pushed into the extruding die. The reinforcement A which was previously formed in the desired shape is inserted into the above-mentioned regulated flow through the guide passage 12 which is in the guide pipe 11 and successively passes into the extruding die 9 without the backward flow phenomenon, and finally the extruded sheet B containing the reinforcement which was uniformly encased in a body is extruded from the extruding port 8.

The Second Embodiment (FIGS. 8–13)

The second embodiment of the present invention is related to an apparatus for producing an extruded shape containing reinforcement which has a lighter weight and wherein there are provided the required number of cores to form hollow portions in the extruded hollow shape and which may be arranged in a similar manner to the apparatus of the first embodiment. Therefore, though the shape and the dimensions of the apparatus are different from those of the first embodiment, the concept is the same, so that in the second embodiment, except for the new constituent members, a prime (') is added to the numerals used in the first embodiment and similarly in the third embodiment, a double prime ('') is added to the same numerals used in the first embodiment.

Figures 13, 19:
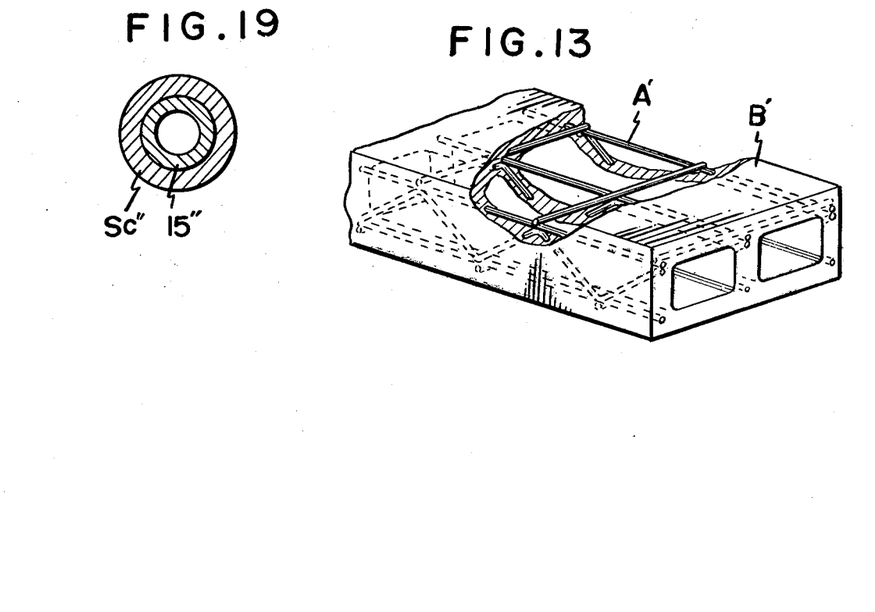
FIG. 13 is a perspective view, partly broken away and in section, of the extruded hollow shape produced according to the second embodiment of the present invention.
FIG. 19 is a sectional view taken on line $c''$—$c''$ in FIG. 15 showing the cross-sectional area of an extrusion passage.
Figure 14:
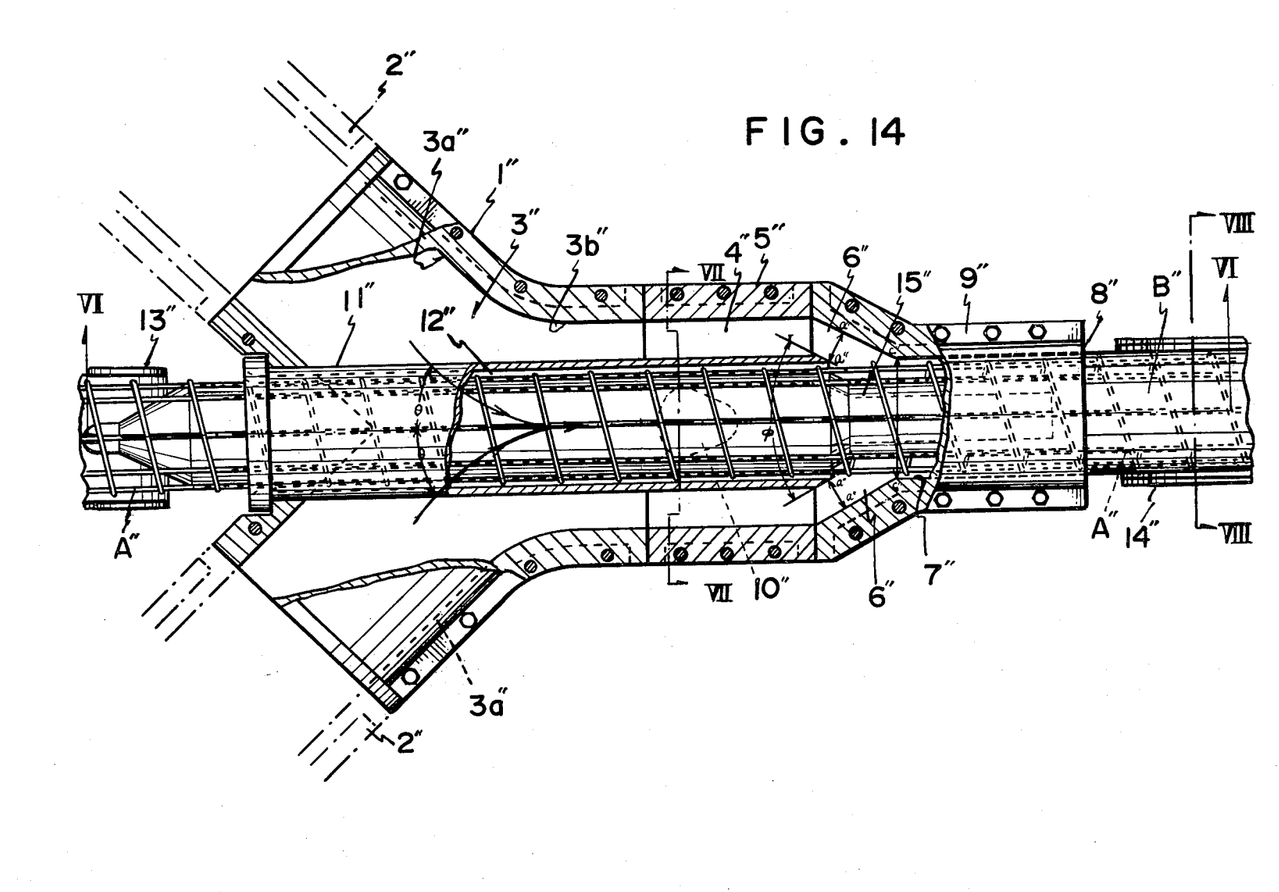
FIG. 14 is a transverse sectional plan view showing an extruding apparatus of a third embodiment for producing extruded pipes according to the present invention.

In the second embodiment, a core 15 is inserted in the guide pipe 11' and the end of the core 15 is drawn or held backward by a wire 16 or the like. The core 15 is kept in a suspended condition at a fixed position by the pressure of the extruding materials. Therefore, the space formed by the guide pipe 11' and the rear of the core 15 composes a guide passage 12' for reinforcement A' and the space formed by the extruding die 9' and the front of the core 15 composes an extruding port 8'. Reinforcement A' previously formed in the desired shape is inserted through the thus constituted guide passage 12', and then the extruded hollow shape B' containing reinforcement (as shown in FIG. 13) can be obtained from the extruding port 8' in the same manner as in the first embodiment.

Figure 1:
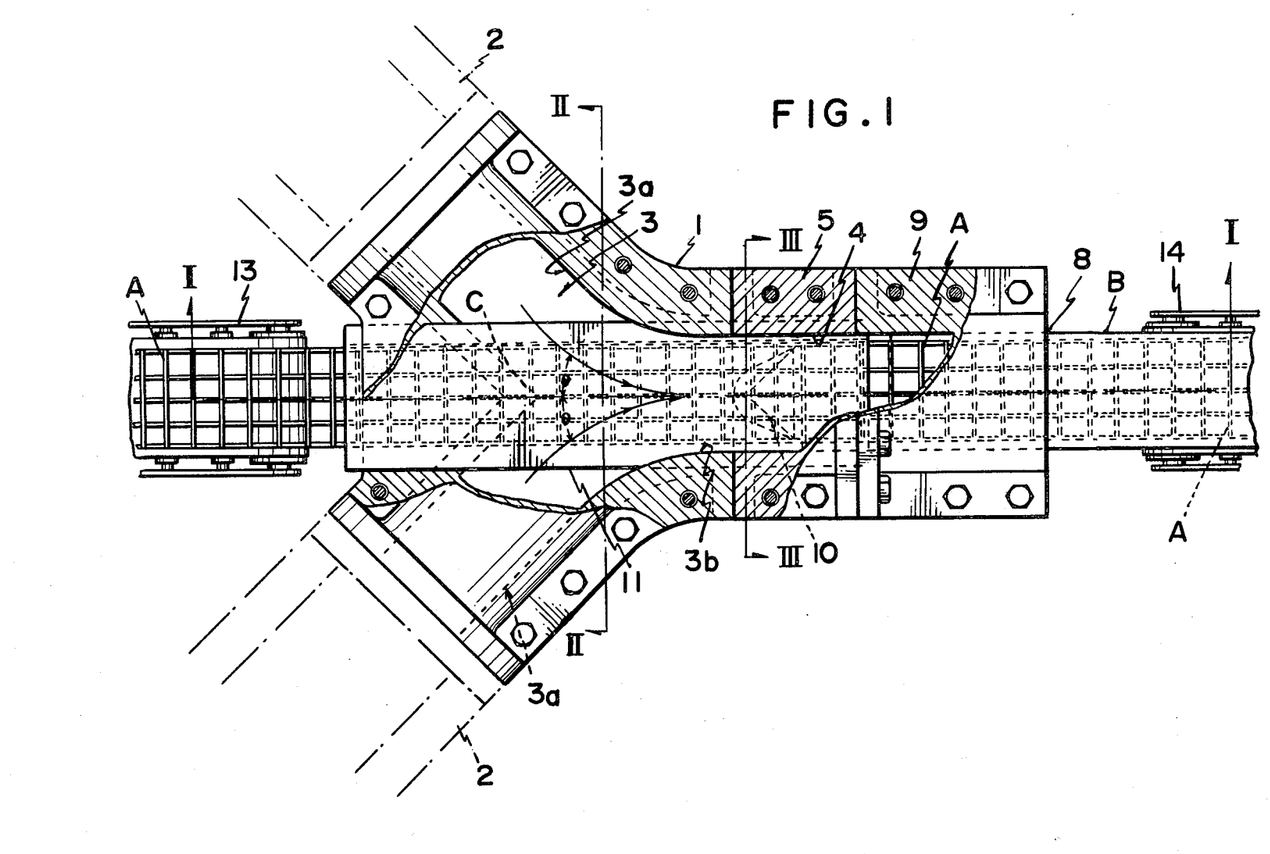
FIG. 1 is a transverse sectional plan view showing an extruding apparatus for producing extruded sheets according to a first embodiment of the present invention.
Figure 2:
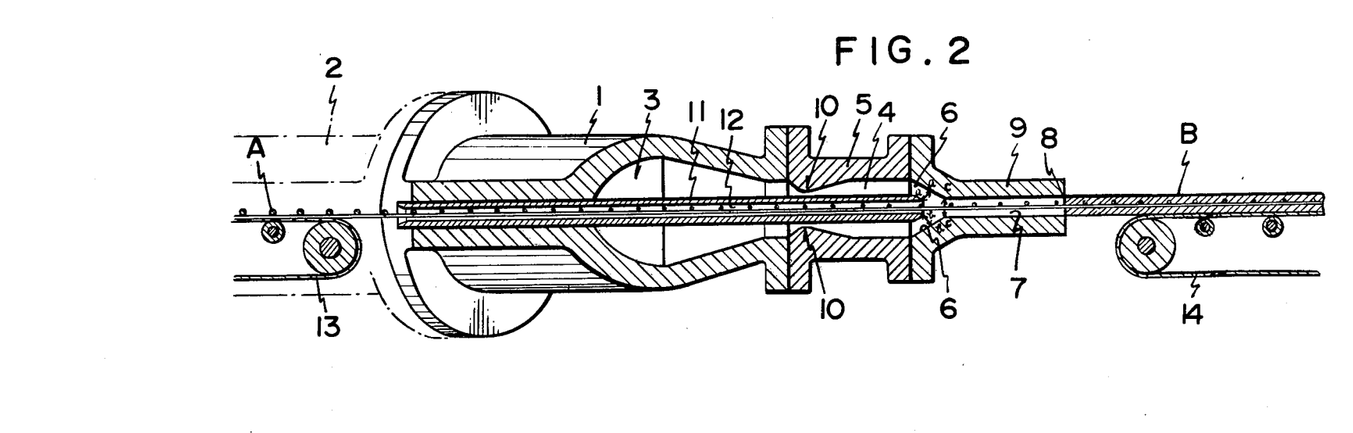
FIG. 2 is a longitudinal side view taken on line I—I in FIG. 1.
Figure 3:
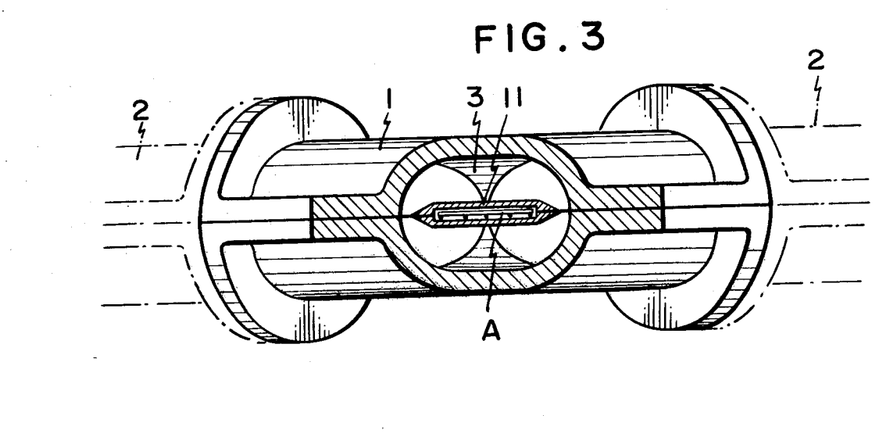
FIGS. 3 and 4 are longitudinal front views respectively taken on lines II—II and line III—III in FIG. 1.
Figures 4, 5, 6, 7:
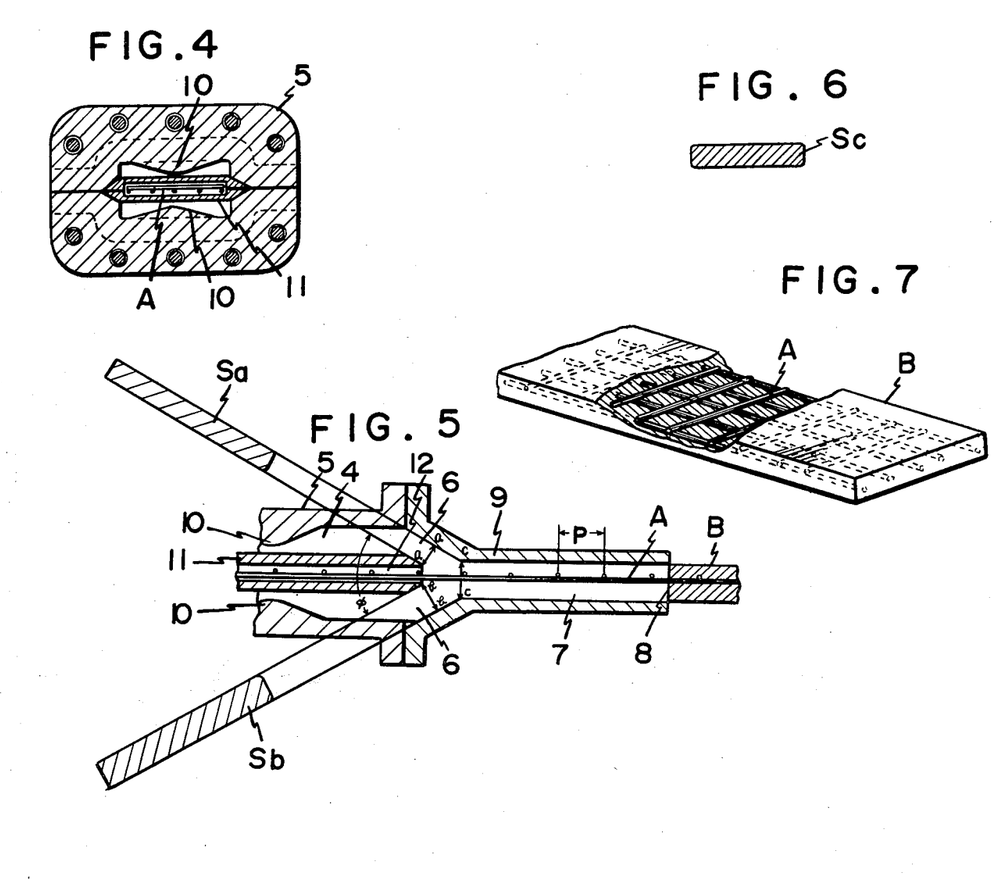
FIG. 5 is a development taken on lines $a$—$a$ and $b$—$b$ in FIG. 2 showing the cross-sectional area of a guide passage for regulated flow.
FIG. 6 is a sectional view taken on line $c$—$c$ in FIG. 2 showing the cross-sectional area of an extrusion passage.
FIG. 7 is a perspective view, partly broken away and in section, of the extruded product produced according to the first embodiment of the present invention.
Figure 8:
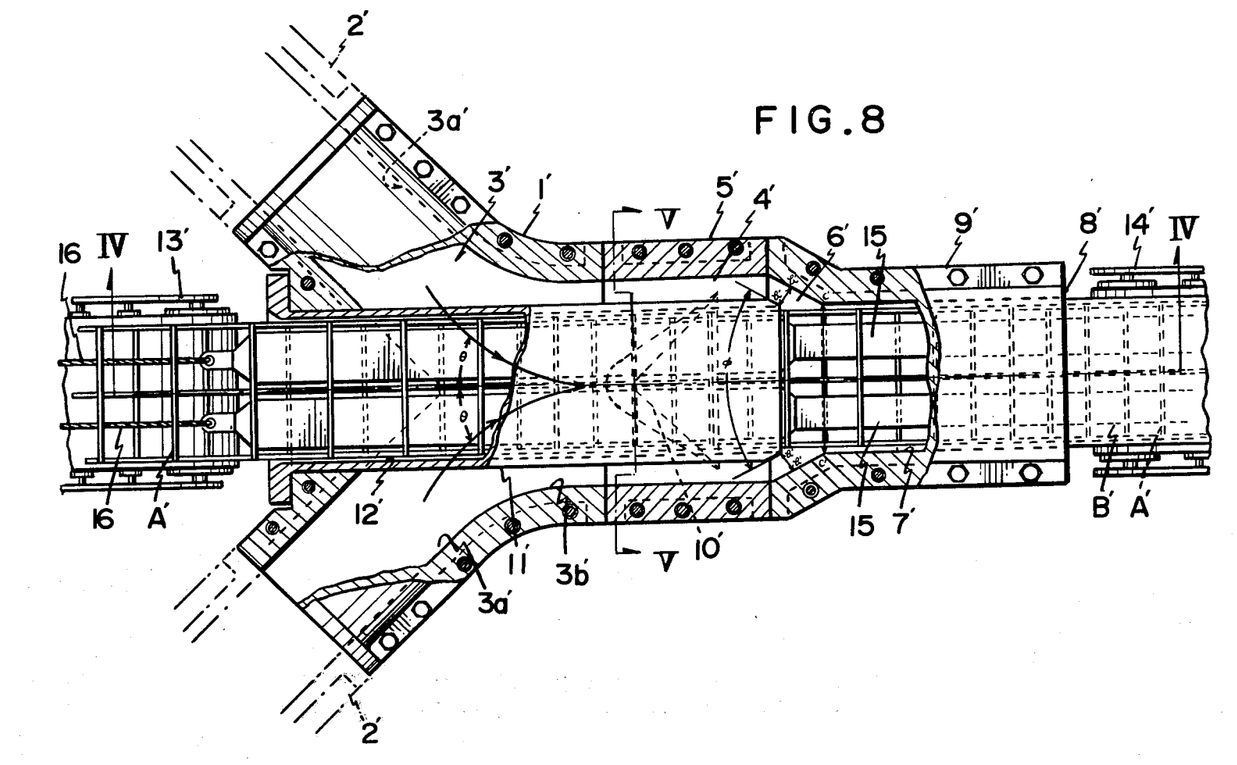
FIG. 8 is a transverse sectional plan view showing an extruding apparatus according to a second embodiment for producing extruded hollow shapes according to the present invention.
Figure 9:
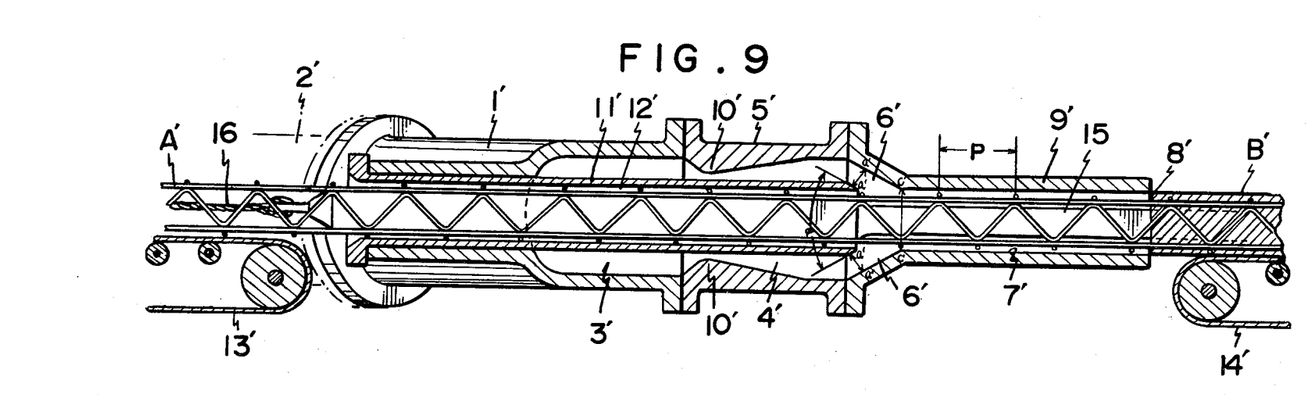
FIG. 9 is a longitudinal side view taken on line IV—IV in FIG. 8.
Figure 10:
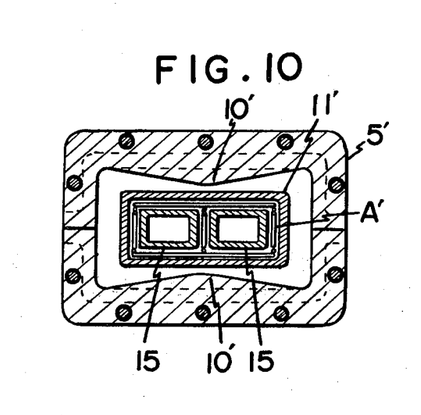
FIG. 10 is a longitudinal front view taken on line V—V in FIG. 8.
Figure 11:
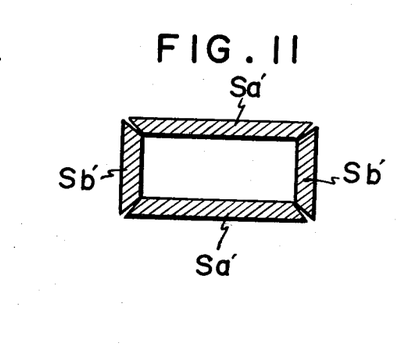
FIG. 11 is a development taken on lines $b'$—$b'$ and $a'$—$a'$ respectively in FIG. 8 and FIG. 9 showing the cross-sectional area of a guide passage for regulated flow.
Figure 12:
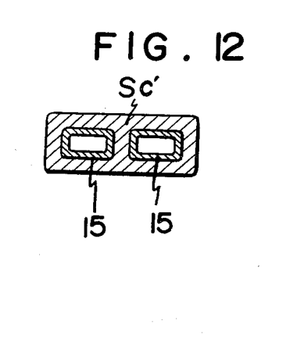
FIG. 12 is a sectional view taken on line $c'$—$c'$ in FIG. 9 showing the cross-sectional area of an extrusion passage.

In this second embodiment, the total of the minimum cross-sectional area of the guide passage 6' for the regulated flow is the sum of the trapezoidal-shaped cross-sectional $Sa'$ of the upper and lower passages taken on line $a'-a'$ in FIG. 9 and the trapezoidal-shaped cross-sectional area $Sb'$ of the right and left passages taken on line $b'-b'$ in FIG. 8 (see FIG. 11). The cross-sectional area $Sc'$ at the end of the extrusion passage 7' is the difference between the whole cross-sectional area of the extrusion passage 7' in the extruding die 9' taken on line $c'-c'$ in FIG. 9 and the whole cross-sectional area of the core 15 (see FIG. 12). Moreover, the length of the extrusion passage 7' is about 3.25 pitches of the crosspiece pitch $p'$ of reinforcement A'.

The Third Embodiment (FIGS. 14–20)

The third embodiment of the present invention is a modification of the apparatus described in the above embodiments and is an apparatus for producing an extruded pipe containing reinforcement.

In this third embodiment, the core 15'' is kept in the extruding die 9'' concentric therewith in the same manner as in the second embodiment. Moreover, reinforcement A'' is composed of several longitudinal straight wires and a spiral wire which encircles the longitudinal straight wires. The thus composed reinforcement A'' is inserted through a guide passage 12'' of a guide pipe 11'' and extruded together with the extruding materials to obtain the extruded pipe B'' containing the reinforcement.

Figure 15:
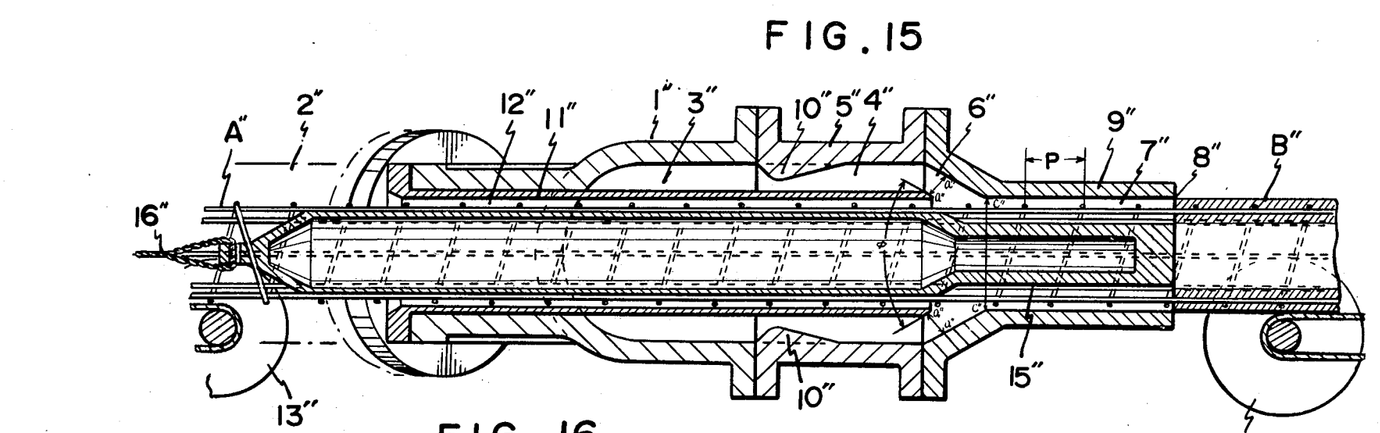
FIG. 15 is a longitudinal side view taken on line VI—VI in FIG. 14.
Figure 16:
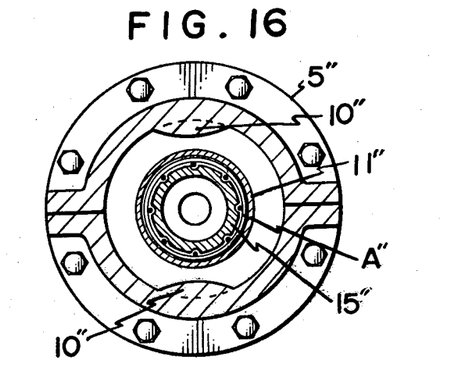
FIG. 16 and FIG. 17 are longitudinal front views respectively taken on lines VII—VII and line VIII—VIII in FIG. 14.
Figure 17:
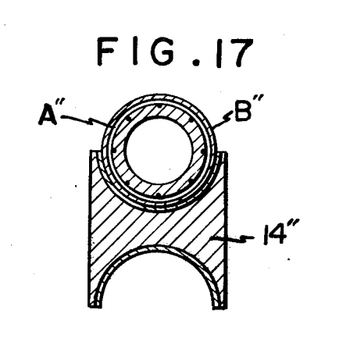
Figure 18:
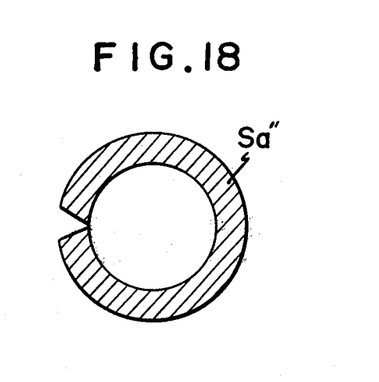
FIG. 18 is a development taken on line $a''$—$a''$ in FIG. 15 showing the cross-sectional area of a guide passage for regulated flow.
Figure 20:
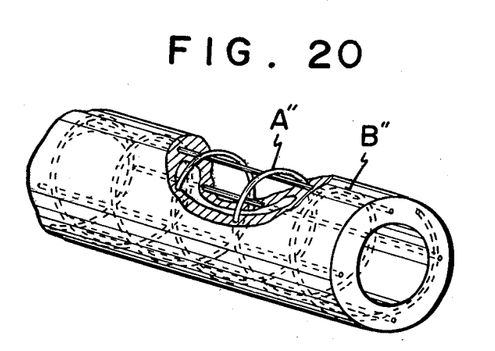
FIG. 20 is a perspective view, partly broken away and in section, of the extruded pipe produced according to the third embodiment of the invention.

In this third embodiment, the total of the minimum cross-sectional area of the guide passage 6'' for the regulated flow is the developed cross-sectional area $Sa''$ of the conical oblique plane taken on line $a''-a''$ in FIG. 15 (see FIG. 18). The cross-sectional area $Sc''$ at the end of the extrusion passage 7'' is the difference between the entire cross-sectional area of the extrusion passage 7'' in the extruding die 9'' taken on line $c'\lambda'-c''$ in FIG. 15 and the entire cross-sectional area of the core 15'' (see FIG. 19).

Moreover, the length of the extrusion passage 7'' is about 3.5 pitches of the spiral wire pitch $p''$ of the reinforcement A''.

As has been described in the preferred embodiment of the present invention, extruded products containing reinforcements can be obtained in desired shapes and in economically large quantities by providing a space in the guide passage and the extruding port in such a way that any reinforcement of any complex shape or structure can pass therethrough and be joined by extruding materials forced in from two directions and be encased therein. Moreover, the thus obtained extruded products have more rigidity and lighter weight when compared to conventional ones due to the characteristic of their reinforcement. Therefore, high rigidity and light weight can be achieved and the initial problems of heavy weight and lack of strength can be overcome according to the present invention, and moreover various modifications and improvements such as U-shaped, I-shaped, or other shaped extruded products may be made with the desired object of employing them within the scope of the present invention.

What is claimed is:

1. Apparatus for molding an extruded product containing a reinforcing material comprising an injection pipe means having a generally Y-shaped configuration which includes two leg portions joined to a juncture portion, an extruding means joined to each of said leg portions for feeding extruded material to each of said leg portions, said extruded material flowing from said two leg portions to combine in said juncture portion, said juncture portion having an outlet, a guide conduit for feeding reinforcing material, said guide conduit extending into and having an axis generally coincident with the axis of said juncture portion of said injection pipe means, said juncture portion comprising a flow regulating means having an internal passage through which said extruded material flows and through which said guide conduit passes, said flow regulating means internal passage having an inlet portion and an outlet portion, said inlet portion having at least a reduced part thereof which has a cross sectional area less than the cross sectional area of said outlet portion, said reduced part thereby defining a throttle for throttling the flow of extruded material into said outlet portion, and extruding die means disposed at said outlet of said juncture portion, said die means having an internal passage having an inlet, said guide conduit having a longitudinal end terminating substantially at said inlet of said internal passage of said die means such that said reinforcing material passes from said guide conduit into said internal passage of said die means, said internal passage of said die means receiving said confined flow of said extruded material from said juncture section of said injection pipe means to thereby flow around said reinforcing material as the latter exits from such guide conduit.

2. Apparatus according to claim 1 wherein said throttle has a converging section followed by a diverging section considered in the direction of flow of said extruded material.

3. Apparatus according to claim 1 wherein two opposing throttles are provided in said inlet portion of said regulating means internal passage.

4. Apparatus according to claim 3 wherein said regulating means internal passage has at least partially a generally polygonal configuration having at least two parallel sides said opposing throttles being located adjacent said two parallel sides.

5. Apparatus for molding an extruded product containing a reinforcing material comprising an injection pipe means having a generally Y-shaped configuration which includes two leg portions joined to a juncture portion, an extruding means joined to each of said leg portions for feeding extruded material to each of said leg portions, said extruded material flowing from said two leg portions to combine in said juncture portion, said juncture portion having an outlet, a guide conduit for feeding reinforcing material, said guide conduit extending into and having an axis generally coincident with the axis of said juncture portion of said injection pipe means, and extruding die means disposed at said outlet of said juncture portion, said die means having an internal passage having an inlet, said guide conduit having a longitudinal end terminating substantially at said inlet of said internal passage of said die means such that said reinforcing material passes from said guide conduit into said internal passage of said die means, said internal passage of said die means receiving said confined flow of said extruded material from said juncture section of said injection pipe means to thereby flow around said reinforcing material as the latter exits from such guide conduit, said internal passage of said die means having an inlet portion and an outlet portion, the minimum cross sectional flow area for extruded material between the terminating end of said guide conduit and said inlet portion being 1.1 to 2.0 times greater than the cross sectional area of said outlet portion.

6. Apparatus according to claim 5 wherein said inlet portion is tapered, said terminating end of said guide conduit extending into said tapered inlet portion, said guide conduit having the external surface of its terminating end tapered in the same general direction as the taper of said inlet portion.

7. Apparatus according to claim 6 wherein said terminating end of said guide conduit terminates within said tapered inlet portion of said die means.

* * * * *